United States Patent
Li

(10) Patent No.: US 10,432,853 B2
(45) Date of Patent: Oct. 1, 2019

(54) IMAGE PROCESSING FOR AUTOMATIC DETECTION OF FOCUS AREA

(71) Applicant: SONY CORPORATION, Tokyo (JP)

(72) Inventor: Pingshan Li, Sunnyvale, CA (US)

(73) Assignee: SONY CORPORATION, Tokyo (JP)

( * ) Notice: Subject to any disclaimer, the term of this patent is extended or adjusted under 35 U.S.C. 154(b) by 230 days.

(21) Appl. No.: 15/443,012

(22) Filed: Feb. 27, 2017

(65) Prior Publication Data
US 2018/0249072 A1    Aug. 30, 2018

(51) Int. Cl.
*H04N 5/228* (2006.01)
*H04N 5/232* (2006.01)
*G06K 9/00* (2006.01)
*G06K 9/32* (2006.01)

(52) U.S. Cl.
CPC ..... *H04N 5/23229* (2013.01); *G06K 9/00228* (2013.01); *G06K 9/00369* (2013.01); *G06K 9/3241* (2013.01)

(58) Field of Classification Search
CPC .................................................. G06K 9/3241
See application file for complete search history.

(56) References Cited

U.S. PATENT DOCUMENTS

| | | | |
|---|---|---|---|
| 7,995,116 B2 | 8/2011 | Pillman et al. | |
| 8,107,805 B2 | 1/2012 | Misawa | |
| 8,363,108 B2 | 1/2013 | Yata | |
| 2010/0008540 A1 | 1/2010 | Shet et al. | |
| 2011/0002678 A1* | 1/2011 | Misawa | G03B 7/006 396/63 |
| 2014/0064558 A1* | 3/2014 | Huang | G06T 7/248 382/103 |
| 2014/0226858 A1 | 8/2014 | Kang et al. | |

* cited by examiner

*Primary Examiner* — Gary C Vieaux
(74) *Attorney, Agent, or Firm* — Chip Law Group

(57) ABSTRACT

A method and a device, such as an imaging device, for image processing for automatic detection of focus area are disclosed herein. In accordance with an embodiment, the device for image processing is the imaging device that is configured to extract a plurality of object features of a plurality of objects in a field-of-view (FOV) of the imaging device. A plurality of confidence maps are generated based on the extracted plurality of object features. The imaging device is further configured to determine a focus area corresponding to the FOV, based on the generated plurality of confidence maps by use of a pre-determined rule.

28 Claims, 10 Drawing Sheets

IMAGE PROCESSING FOR AUTOMATIC DETECTION OF FOCUS AREA

CROSS-REFERENCE TO RELATED APPLICATIONS/INCORPORATION BY REFERENCE

None.

FIELD

Various embodiments of the disclosure relate to a method and device for image processing. More specifically, various embodiments of the disclosure relate to image processing for automatic detection of focus area.

BACKGROUND

Recent advancements in the field of digital photography have introduced various applications that may be implemented in image-capturing devices, such as a camera. Based on such applications, multiple events at salient timestamps may be captured, in accordance with the genre of photography. For example, in sports photography, the salient timestamps may correspond to a shot served by a tennis player or a goal kicked by a soccer player during a tennis match or a soccer match, respectively.

While capturing images during such salient timestamps, a variety of techniques may be used to select a focus area in the images. In one case, the focus area may be manually selected by the photographers, based on preferences provided by the photographers while the images are being captured. In another case, the focus area may be automatically selected by the image-capturing device in autofocus mode based on various techniques. In such a case, the photographers may prefer to capture images either randomly or continuously in the autofocus mode during an event. Such images in the autofocus mode may be captured based on automatic and/or simulated adjustment of focus settings of the image-capturing device. Typically, the autofocus mode may continually track the object based on a specific pattern associated with an object when a field-of-view (FOV) of the imaging device includes a single instance of the object. However, in certain scenarios, when the FOV comprises multiple objects, it may become difficult for the imaging device to determine the focus area as different objects require different auto-focus settings at different timestamps during the event.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and device for image processing is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 3A, 3B, 3C, 3D, and 3E illustrate various exemplary scenarios for implementation of the disclosed method and device for image processing, in accordance with an embodiment of the disclosure.

DETAILED DESCRIPTION

Figure 1:
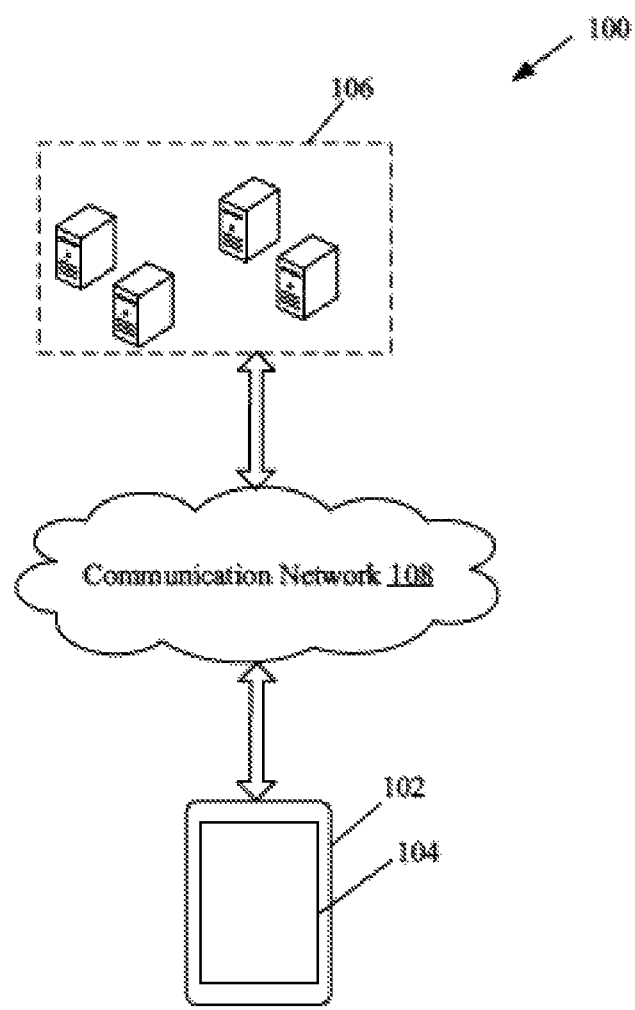
FIG. 1 is a block diagram that illustrates a network environment, in accordance with an embodiment of the disclosure.

Various implementations may be found in a method and/or device for image processing. Exemplary aspects of the disclosure may comprise a method that may comprise extraction of a plurality of object features of a plurality of objects by an imaging device. The plurality of objects may be included in a field-of-view (FOV) of the imaging unit. Based on the extracted plurality of object features, a plurality of confidence maps may be generated. A final confidence map may be generated based on the plurality of confidence maps. The focus area may be determined within the final confidence map. The focus area within the FOV may be set based on the pre-determined rule. The pre-determined rule may be based on one or more of a lens setting, depth information, and/or motion information of the plurality of objects in the FOV of the imaging device. In accordance with an embodiment, the FOV may correspond to a scene detected by the imaging device. Further, the image of the FOV may be captured based on the determined focus area.

In accordance with an embodiment, a depth-of-field (DOF) value may be determined based on setting parameters of the imaging device and depth information of the FOV. Based on the determined DOF, the focus area within the FOV may be set. The focus area may be set to a center portion of the FOV when the pre-determined rule specifies that the DOF value of the FOV exceeds a pre-determined DOF threshold value.

In accordance with an embodiment, the plurality of objects within the FOV may correspond to one or more human beings. The focus area may be set to an object among the plurality of objects in the FOV, when the pre-determined rule specifies that a motion value of the object is highest as compared with other motion values of other objects in the FOV.

In accordance with an embodiment, the focus area may be set to an object among the plurality of objects in the FOV, when the pre-determined rule specifies that motion values of the plurality of objects are equal and a depth value of the object is smallest as compared with other depth values of other objects in the FOV. In accordance with an embodiment, the focus area may be set to a frontal view of a facial portion of an object among the plurality of objects in the FOV. This may occur when the pre-determined rule specifies that motion values of the plurality of objects are less than a pre-determined threshold value and the depth value of the object is smallest as compared with other depth values of the other objects in the FOV.

In certain scenarios, when a face/facial portions is/are detected, a closest face/facial portion may be focused. In certain scenarios, human face or the facial portions of the plurality of objects in the FOV cannot be determined. In such scenarios, when human face or the facial portions cannot be detected, a human body may still be detected using pre-defined rules. Further, if multiple human bodies are detected, then depth values obtained for different human bodies may be used to ascertain the closest human body detected within the FOV, and then the nearest human body may be focused. In certain scenarios, when either of the facial portion(s) or human body is/are not detected, a nearest object other than the human body may be focused. Thus, the focus area may be dynamically set as per the pre-defined rules associated with a type of object (such as human, or non-human), orientation of object, position of object, motion state of the object, and/or a size of the object within the current FOV.

FIG. 1 is a block diagram that illustrates a network environment, in accordance with an embodiment of the disclosure. With reference to FIG. 1, there is shown a network environment 100. The network environment 100 may include an imaging device 102, a display screen 104, a plurality of cloud-based resources 106, and a communication network 108. The imaging device 102 may comprise the display screen 104. The imaging device 102 may be communicatively coupled to the plurality of cloud-based resources 106, via the communication network 108.

The imaging device 102 may comprise suitable logic, circuitry, interfaces, and/or code that may be configured to set a focus area within the FOV of an image-capturing unit (not shown in FIG. 1). The imaging device 102 may determine the focus area within the FOV of a final confidence map, based on a pre-determined rule from a set of pre-determined rules. Examples of the imaging device 102 may include, but are not limited to, a smartphone, a camera, a tablet computer, a laptop, a wearable electronic device, and/or other such computing devices.

The display screen 104 may comprise suitable circuitry and/or interfaces that may be configured to display an output image data received from the imaging device 102. The display screen 104 may be realized through several known technologies, such as, but not limited to, Liquid Crystal Display (LCD) display, Light Emitting Diode (LED) display, and/or Organic LED (OLED) display technology.

The plurality of cloud-based resources 106 may comprise one or more servers that may provide one or more functional services and/or image data to one or more subscribed electronic devices, such as the imaging device 102. The plurality of cloud-based resources 106 may be implemented by use of several technologies that are well known to those skilled in the art. The one or more servers from the plurality of cloud-based resources 106 may be associated with a single or multiple service providers. Examples of the one or more servers may include, but are not limited to, Apache™ HTTP Server, Microsoft® Internet Information Services (IIS), IBM® Application Server, Sun Java™ System Web Server, and/or a file server.

The communication network 108 may include a medium through which the imaging device 102 may communicate with one or more servers, such as the plurality of cloud-based resources 106. Examples of the communication network 108 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

In operation, the imaging device 102 may be configured to receive an FOV of an event, such as a sports event. In accordance with an embodiment, the FOV of the event may be received from the plurality of cloud-based resources 106, via the communication network 108. In accordance with an embodiment, the FOV of the event may be received from the image-capturing unit, installed within the imaging device 102 or communicatively coupled with the imaging device 102. In such a case, the image-capturing unit may generate image data that includes a plurality of objects in the FOV. The imaging device 102 may be configured to extract a plurality of object features of each of the plurality of objects present in the FOV.

In accordance with an embodiment, the imaging device 102 may be configured to generate a plurality of confidence maps, based on the extracted plurality of object features. The plurality of confidence maps may be averaged to generate a final confidence map. The imaging device 102 may use a pre-determined rule to determine a focus area within the final confidence map. The pre-determined rule may be retrieved from a local memory or from one of the plurality of cloud-based resources 106.

In accordance with an embodiment, the pre-determined rule may be selected based on a probability of maximum usage of the pre-determined rule for the event, indicated by a statistical model. The statistical model may be pre-stored in the local memory or in one of the plurality of cloud-based resources 106. The statistical model may include a probability of usage of each of the set of pre-determined rules for the event and other events as well. The statistical model may be created in a tabular form, based on a previous learning experience from focus areas in published professional photographs preferred by professional photographers.

In accordance with an embodiment, the pre-determined rule may be selected by the imaging device 102, based on a verification of a condition that is specified by the pre-determined rule. Based on the verified condition, the imaging device 102 may be configured to determine the focus area within the final confidence map. Accordingly, the determined focus area is set within the FOV, based on the condition specified by the pre-determined rule.

In accordance with an embodiment, the focus area may be determined by the imaging device 102 to be at the center portion of the final confidence map, when the pre-determined rule specifies that a depth-of-field (DOF) value of the FOV exceeds a pre-determined DOF threshold value. In such a case, the imaging device 102 may be configured to determine the DOF value based on setting parameters of the image-capturing unit and depth values of the plurality of objects present in the FOV. Based on the determined DOF value, the determined focus area may be set at the center portion of the FOV.

In accordance with an embodiment, the focus area may be determined by the imaging device 102 to beat an object in the final confidence map, when the pre-determined rule specifies that a motion value of the object is highest as compared with other motion values of other objects in the FOV. In such a case, the imaging device 102 may be configured to determine the motion values of the plurality of objects in the FOV. Based on the determined motion values of the plurality of objects, the determined focus area may be set at the object in the FOV.

In accordance with an embodiment, the focus area may be determined by the imaging device 102 to beat an object in the final confidence map, when the pre-determined rule specifies that the motion values of the plurality of objects are equal and depth value of the object is the smallest as compared with the other depth values of other objects in the FOV. In such a case, the imaging device 102 may be configured to determine the motion values and depth values of the plurality of objects in the FOV. Based on the determined motion values and depth values, the determined focus area may be set at the object in the FOV.

In accordance with an embodiment, the focus area may be determined by the imaging device 102 to be at an object in the final confidence map, when the pre-determined rule specifies that the determined motion values of the plurality of objects are less than a pre-determined threshold value, and the depth value of the object is the smallest as compared to the other depth values of other objects in the FOV. Based on the determined motion values and depth values, the determined focus area may be set at the object in the FOV.

In accordance with an embodiment, the focus area may be determined by the imaging device 102 to be at an object in the final confidence map, when the pre-determined rule specifies that facial portion of the plurality of objects are detected and the depth value of the object is smallest as compared with the other depth values of the other objects in the FOV. In such a case, the imaging device 102 may be further configured to determine the facial portion of the plurality of objects in the FOV. Based on the depth values and facial portions of the plurality of objects in the FOV, the determined focus area may be set at the object in the FOV. In certain scenarios, human face or the facial portions of the plurality of objects in the FOV cannot be determined. For example, a user may be wearing a helmet in a game or the user may turn around such that face portion is not visible for certain time duration. In such scenarios, when human face or the facial portions cannot be detected, a human body may still be detected using pre-defined rules. Further, if multiple human bodies are detected, then depth values obtained for different human bodies may be used to ascertain the closest human body detected within the FOV. For example, a depth value (or depth of field (DOF) value) "1" may be obtained from a depth sensor for a first human body detected in the FOV. A depth value (or depth of field (DOF) value) "2" may be obtained from the depth sensor for a second human body detected in the FOV. Thus, the first human body detected in the FOV may be determined as closest human body and the determined focus area may be set at the closest human body in the FOV even when human face or the facial portions cannot be detected. Thus, the focus area may be dynamically set as per the pre-defined rules associated with a type of object (such as human, or non-human), orientation of object, position of object, motion state of the object, and/or a size of the object within the current FOV.

In accordance with an embodiment, the focus area may be determined by the imaging device 102 to beat an object in the final confidence map, when the pre-determined rule specifies that the depth value of the object is the smallest as compared with the other depth values of the other objects in the FOV. Accordingly, the focus area may be set at the object in the FOV. The imaging device 102 may be configured to set the determined focus area in the FOV, and capture an image thereof. In accordance with an embodiment, the imaging device 102 may update the statistical model based on the pre-determined rule utilized to set the determined focus area in the captured image.

Figure 2:
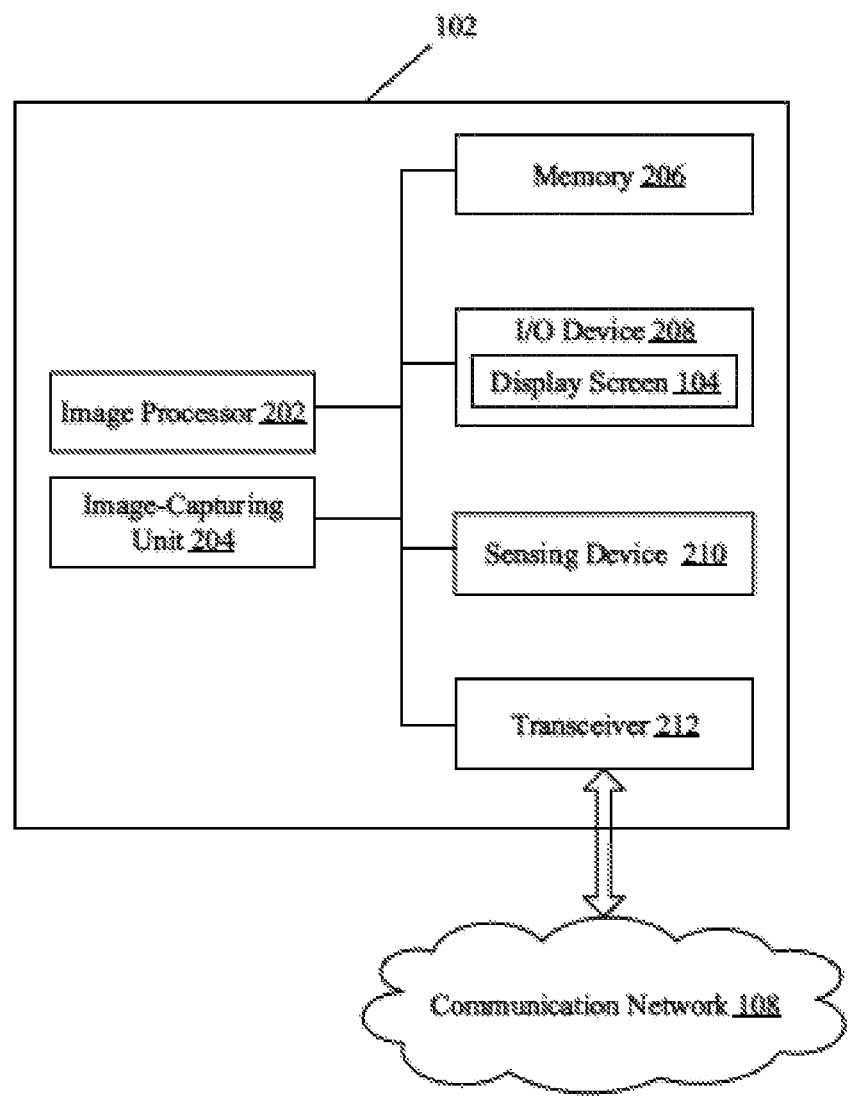
FIG. 2 is a block diagram that illustrates an exemplary imaging device, in accordance with an embodiment of the disclosure.

FIG. 2 is a block diagram that illustrates an exemplary imaging device, in accordance with an embodiment of the disclosure. FIG. 2 is explained in conjunction with elements from FIG. 1. With reference to FIG. 2, there is shown the imaging device 102. The imaging device 102 may comprise an image processor 202, an image-capturing unit 204, a memory 206, one or more input/output (I/O) devices, such as an I/O device 208, one or more sensing devices, such as a sensing device 210, and a transceiver 212. With reference to FIG. 2, there is further shown the display screen 104 and the communication network 108, as described in FIG. 1.

The image processor 202 may be communicatively coupled to the memory 206, the I/O device 208, the sensing device 210, and the transceiver 212. The transceiver 212 may be configured to communicate with the one or more servers, such as the plurality of cloud-based resources 106, via the communication network 108.

The image processor 202 may comprise suitable logic, circuitry, interfaces, and/or code that may be configured to execute a set of instructions stored in the memory 206. The image processor 202 may be further configured to extract a plurality of object features of the plurality of objects present in the FOV of the image-capturing unit 204. The image processor 202 may be implemented based on a number of electronic control unit technologies known in the art. Examples of the image processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The image-capturing unit 204 may comprise suitable logic, circuitry, interfaces, and/or code that may be configured to capture one or more scenes in real time. The image-capturing unit 204 may be further configured to capture still views in a sequence of frames. The image-capturing unit 204 may comprise a viewfinder that may be configured to compose and/or focus the one or more scenes captured by the image-capturing unit 204. The image-capturing unit 204 may be configured to store the captured one or more scenes in a local buffer and/or the memory 206.

The memory 206 may comprise suitable logic, circuitry, and/or interfaces that may be configured to store a machine code and/or a computer program with at least one code section executable by the image processor 202. The memory 206 may further be configured to store one or more of a motion detection algorithm, a depth detection algorithm, a human detection algorithm, and/or a face detection algorithm. The memory 206 may be further configured to store operating systems and associated applications of the imaging device 102. Examples of implementation of the memory 206 may include, but are not limited to, Random Access Memory (RAM), Read Only Memory (ROM), Hard Disk Drive (HDD), Flash memory, and/or a Secure Digital (SD) card.

The I/O device 208 may comprise suitable logic, circuitry, interfaces, and/or code that may be configured to receive an input from the user (not shown). The I/O device 208 may be further configured to provide an output to the user. The I/O device 208 may comprise various inputs and output devices that may be configured to communicate with the image processor 202. Examples of the input devices may include, but are not limited to, the image-capturing unit 204, a camcorder, a touch screen, a keyboard, a mouse, a joystick, a microphone, a motion sensor, a light sensor, and/or a docking station. Examples of the output devices may include, but are not limited to, the display screen 104, a projector screen, and/or a speaker.

The sensing device 210 may comprise suitable logic, circuitry, and/or interfaces that may be configured to store a machine code and/or a computer program with at least one code section executable by the image processor 202. The sensing device 210 may comprise one or more sensors for detection of the plurality of objects, within the FOV of the image-capturing unit 204. The one or more sensors may be utilized to detect the plurality of object features, such as human faces, motion values, and/or depth values, of the detected plurality of objects. The sensing device 210 may further comprise one or more sensors to aid in capture of the one or more scenes (as still images and/or video streams) by the image-capturing unit 204. Examples of the one or more sensors may include, but are not limited to, an object detection sensor, a human detection sensor, a human face detection sensor, a motion sensor, a depth sensor, an accelerometer, a global positioning system (GPS) sensor, a compass or magnetometer, an ambient light sensor, a tricorder, a gyroscope, a proximity sensor, an image sensor, a lux meter, a touch sensor, and/or an infrared sensor.

The transceiver 212 may comprise suitable logic, circuitry, interfaces, and/or code that may be configured to communicate with one or more servers, such as the plurality of cloud-based resources 106, via the communication network 108 (as shown in FIG. 1). The transceiver 212 may implement known technologies to support wired or wireless communication of the imaging device 102 with the communication network 108. The transceiver 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The transceiver 212 may communicate, via wireless communication, with networks (such as the Internet and/or an Intranet) and/or a wireless network (such as a cellular telephone network, a wireless local area network (LAN) and/or a metropolitan area network (MAN)). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the image-capturing unit 204 may detect an FOV of an event, such as a soccer match, and communicate the FOV to the image processor 202. The FOV may comprise a plurality of objects, such as a human, an audience, and/or a soccer ball. The image processor 202 may receive the FOV of the event from the image-capturing unit 204 and detect the plurality of objects in the FOV. The detection may be based on one or more object detection algorithms, retrieved from the memory 206. In accordance with an embodiment, the plurality of objects in the FOV may be automatically detected, based on one or more pre-stored learning algorithms, retrieved from a database (not shown in FIG. 2). The database may be a cloud-based knowledge resource from the plurality of cloud-based resources 106. The sensing device 210 may be configured to extract the plurality of object features, such as a human face, a motion value and/or a depth value, of each object of the detected plurality of objects in the FOV.

The image processor 202 may be configured to generate a plurality of confidence maps, based on the extracted plurality of object features. For certain object features, such as the depth value, the confidence map may be generated by use of current image, based on one or more techniques, known in the art. Examples of such one or more techniques may include an estimation of magnitude of at least one gradient associated with the object feature, likelihood of object feature matching with a template feature, local constraints, global constraints, limiting functions, and/or a combination thereof. For other object features, such as motion values, the confidence map may be generated by use of a set of two or more images. In such cases, the confidence map may reflect the reliability of individual disparity estimates for the detected plurality of objects in the FOV. The individual disparity may be estimated based on an implementation of one or more object and/or pattern matching techniques on the set of two or more images of the detected plurality of objects in the FOV. Based on the matching techniques, the image processor 202 may determine point correspondences between each of the detected plurality of objects in the set of two or more images.

The image processor 202 may further determine displacement vectors, such as optical vectors, between two corresponding points for each object in the set of two or more images. Based on the determined displacement vectors, the image processor 202 may determine the reliability of individual disparity estimate for each of the plurality of objects. The reliability of individual disparity estimate of the object features may be represented graphically in corresponding confidence map. A high reliability may be represented in the confidence map as a region with high intensity of color values, such as white color. Similarly, low reliability may be represented in the confidence map as a region with low intensity of color values, such as various shades of gray color. In accordance with an embodiment, the plurality of confidence maps may be generated, based on one or more dynamic modeling algorithms, retrieved from the memory 206.

The image processor 202 may be configured to apply a technique, such as confidence map averaging (CMA), on the plurality of confidence maps to generate a final confidence map. Notwithstanding, the disclosure may not be so limited, and other techniques known in the art may be implemented to generate the final confidence map, without deviation from the scope of the disclosure. Once the final confidence map is generated, the image processor 202 may determine a focus area by use of a pre-determined rule.

In accordance with an embodiment, the image processor 202 may access a statistical model to select the pre-determined rule to determine the focus area in the final confidence map. The pre-determined rule may be selected based on a probability of maximum usage of the pre-determined rule for the event, as indicated by the statistical model. As explained in FIG. 1, the statistical model may be created in a tabular form, based on a previous learning experience from focus areas in published professional photographs preferred by professional photographers. The statistical model may be deduced by the image processor 202 based on focus area analysis of a repository of published professional photographs. One or more learning algorithms may be applied for the analysis of the focus areas in the repository of the published professional photographs to deduce such set of pre-determined rules for various events.

In accordance with an embodiment, the pre-determined rules may be stored in the memory 206, from which such rules may be retrieved. Alternatively, the rules may be determined, learnt, and/or updated in run time, that is, while the operations are performed in real-time or near-real-time, to determine the focus area. In accordance with an embodiment, the transceiver 212 may receive the pre-determined rule from one of the plurality of cloud-based resources 106, via the communication network 108. The transceiver 212 may communicate the received pre-determined rule to the image processor 202.

In accordance with an embodiment, the image processor 202 may select the pre-determined rule from the set of pre-determined rules. The set of pre-determined rules may comprise different conditions for the first pre-determined rule, the second pre-determined rule, the third pre-determined rule, the fourth pre-determined rule, the fifth pre-determined rule, and the sixth pre-determined rule. Notwithstanding, the disclosure may not be so limited and additional rules or a lesser number of rules may be implemented without limiting the scope of the disclosure. The pre-determined rule may be selected from the set of pre-determined rules, based on a verification of a condition that is specified by the corresponding pre-determined rule. Based on the selected pre-determined rule, the image processor 202 may be configured to determine the focus area within the final confidence map. Accordingly, the determined focus area is set within the FOV, based on the condition specified by the pre-determined rule.

In accordance with an embodiment, the image processor 202 may be configured to determine the focus area at the center portion of the final confidence map, when the pre-determined rule specifies that a depth-of-field (DOF) value of the FOV exceeds a pre-determined DOF threshold value. In such a case, the image processor 202 may be configured to determine the DOF value based on setting parameters of the image-capturing unit and depth values of the plurality of objects present in the FOV. Based on the determined DOF value, the image processor 202 may be configured to set the determined focus area within the FOV.

In accordance with an embodiment, image processor 202 may be configured to determine the focus area at an object in the final confidence map, when the pre-determined rule specifies that the motion value of the object is highest as compared with other motion values of other objects in the FOV. The image processor 202 may be configured to determine the motion values of the plurality of objects in the FOV, based on the sensor data received from the sensing device 210, such as motion sensors. Based on the determined motion values of the plurality of objects, the image processor 202 may set the determined focus area in the FOV.

In accordance with an embodiment, the image processor 202 may be configured to determine the focus area at an object in the final confidence map, when the pre-determined rule specifies that motion values of the plurality of objects are equal and a depth value of the object is the smallest as compared with other depth values of other objects in the FOV. In such a case, the image processor 202 may be configured to determine the motion values and depth values of the plurality of objects in the FOV. Based on the determined motion values and depth values, the image processor 202 may be configured to set the determined focus area at the object in the FOV.

In accordance with an embodiment, the image processor 202 may be configured to determine the focus area at an object in the final confidence map, when the pre-determined rule specifies that the determined motion values of the plurality of objects are less than a pre-determined threshold value, and the depth value of the object is smallest as compared to the other depth values of other objects in the FOV. Based on the determined motion values and depth values, the image processor 202 may be configured to set the determined focus area at the object in the FOV.

In accordance with an embodiment, the image processor 202 may be configured to determine the focus area at an object in the final confidence map, when the pre-determined rule specifies that facial portions of the plurality of objects are not detected and the depth value of the object is the smallest as compared with the other depth values of the other objects in the FOV. In such a case, image processor 202 may determine the facial portions of the plurality of objects in the FOV. Based on the depth values and facial portions of the plurality of objects in the FOV, the image processor 202 may be configured to set the determined focus area at the object in the FOV.

In accordance with an embodiment, the image processor 202 may be configured to determine the focus area at an object in the final confidence map, when the pre-determined rule specifies that the depth value of the object is the smallest as compared with the other depth values of the other objects in the FOV. Accordingly, the image processor 202 may be configured to set the determined focus area in the FOV. The image processor 202 may be configured to set the determined focus area in the FOV, and capture an image thereof. In accordance with an embodiment, the image processor 202 may update the statistical model based on the pre-determined rule utilized to set the determined focus area in the captured image.

Figure 3A:
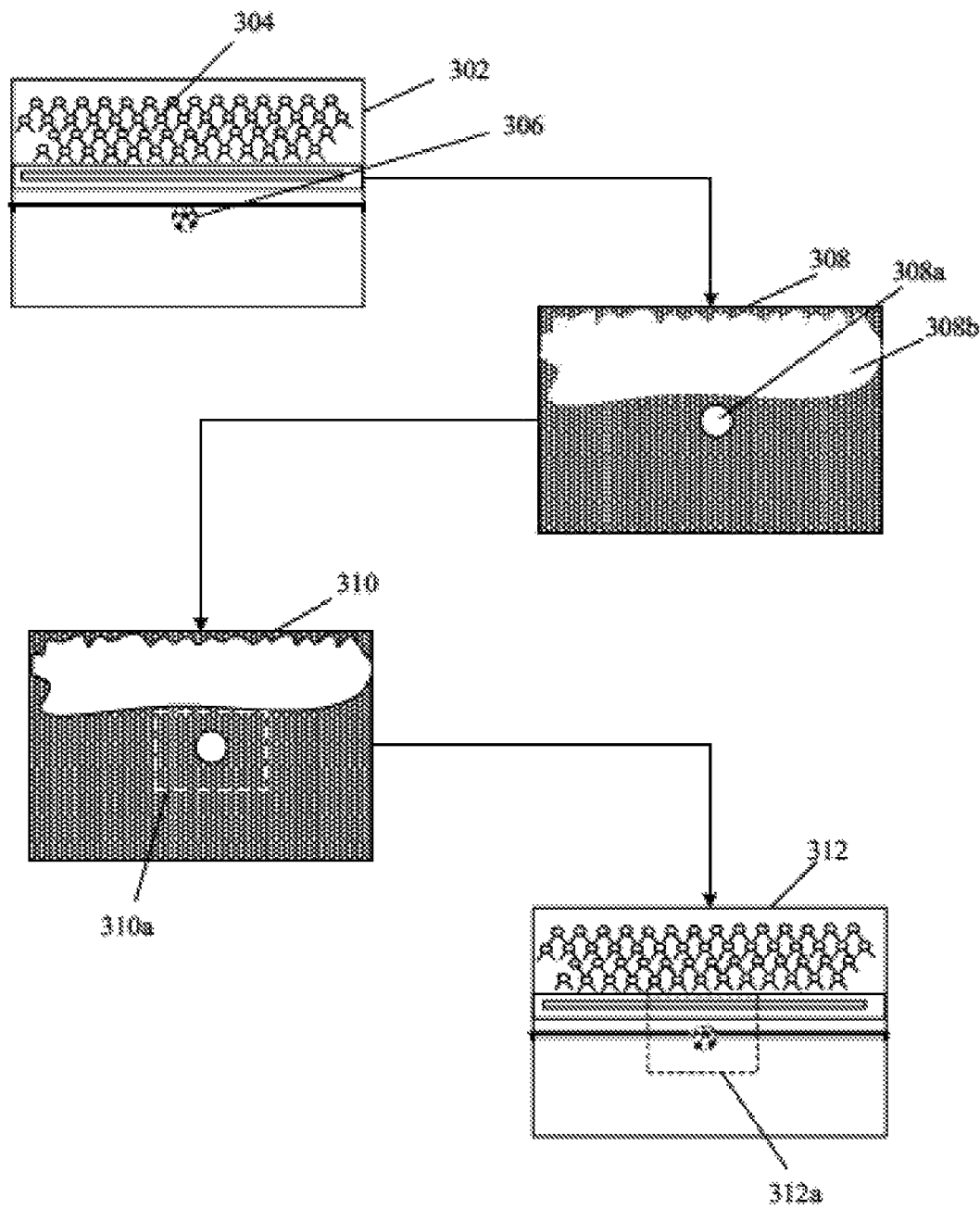

FIGS. 3A, 3B, 3C, 3D, and 3E illustrate various exemplary scenarios for the implementation of the disclosed method and device for image processing, in accordance with an embodiment of the disclosure. FIGS. 3A, 3B, 3C, 3D, and 3E are explained in conjunction with elements from FIG. 1 and FIG. 2. With reference to FIG. 3A, there is shown an FOV 302 of the imaging device 102 that includes an audience 304 and a soccer ball 306. Further, there is shown an initial confidence map 308, a final confidence map 310, and an image 312. The initial confidence map 308 may comprise a first region 308a and a second region 308b. The final confidence map 310 may include a region 310a that corresponds to a focus area. The image 312 is an image captured by the imaging device 102 with a focus area 312a. With reference to FIG. 3A, the determination of the focus area 312a for the FOV 302, is described below. Certain confidence maps, such as the initial confidence map 308 and the final confidence map 310 may also be referred to as depth maps, as these confidence maps are determined based DOF values.

In accordance with a first exemplary scenario, as illustrated in FIG. 3A, the FOV 302 may be a scene of a sports event, such as a soccer match. The FOV 302 may comprise a plurality of objects, such as the audience 304 and the soccer ball 306. The image processor 202 may be configured to determine the DOF value, based on setting parameters of the imaging device 102 and depth values of the audience 304 and the soccer ball 306 in the FOV 302.

The image processor 202 may be configured to generate the initial confidence map 308, based on the determined DOF values. The initial confidence map 308 may comprise the first region 308a and the second region 308b. The first region 308a may correspond to the soccer ball 306 and the second region 308b may correspond to the audience 304. The depth values of the first region 308a and second region 308b may be determined as, "$z_1$" and "$z_2$", respectively. The first region 308a and the second region 308b may be represented with an equal intensity value in the initial confidence map 308.

The DOF value may be determined based on the determined depth values, "$z_1$" and "$z_2$", and setting parameters of the lens of the image-capturing unit 204. The initial confidence map 308 may be normalized to generate the final confidence map 310. The image processor 202 may determine that the DOF value of the FOV 302 exceeds a pre-determined DOF threshold value. The image processor 202 may be further configured to use a pre-determined rule in the set of pre-determined rules to determine a focus area in the FOV 302. The image processor 202 may use a first pre-determined rule, such as to determine a focus area as a center of an FOV if the DOF value of the FOV exceeds the pre-determined DOF threshold value, to determine the focus area in the FOV 302. The determined focus area may encompass the region 310a in the final confidence map 310. The region 310a may correspond to a center region in the final confidence map 310 and represented by a dotted line, as shown in FIG. 3A. The image processor 202 may be further configured to set the focus area 312a in the image 312 based on the determined focus area encompassing the region 310a in the final confidence map 310. The focus area 312a may further correspond to a center region in the image 312. Thus, the image-capturing unit 204 may capture the image 312 with the focus area 312a that corresponds to the FOV 302.

Figure 3B:
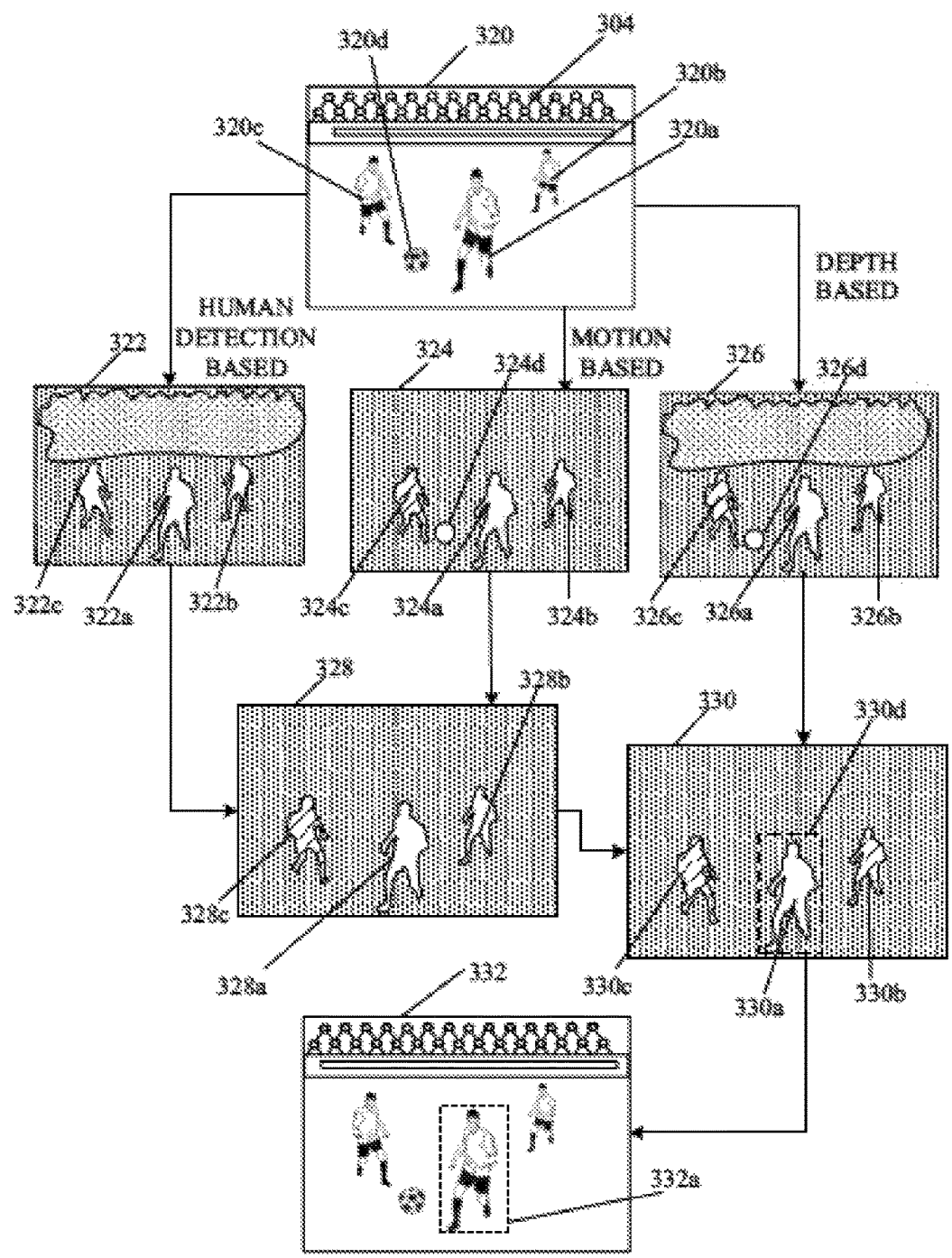

With reference to FIG. 3B, there is shown an FOV 320, a first confidence map 322, a second confidence map 324, a third confidence map 326, a fourth confidence map 328, and a final confidence map 330 and an image 332. The FOV 320 may comprise a plurality of objects, such as the audience 304, a first player 320a, a second player 320b, a third player 320c, and a soccer ball 320d. The first confidence map 322 may comprise a first region 322a, a second region 322b, and a third region 322c. The second confidence map 324 may comprise a first region 324a, a second region 324b, a third region 324c, and a fourth region 324d. The third confidence map 326 may comprise a first region 326a, a second region 326b, a third region 326c, and a fourth region 326d. The fourth confidence map 328 may comprise a first region 328a, a second region 328b, and a third region 328c. The final confidence map 330 may comprise a first region 330a, a second region 330b, a third region 330c, and a focus area 330d. The image 332 may comprise a focus area 332a. FIG. 3B is explained in conjunction with elements from FIG. 1, FIG. 2 and FIG. 3A.

In accordance with a second exemplary scenario, as illustrated in FIG. 3B, the FOV 320 may comprise the first player 320a, the second player 320b, and the third player 320c, chasing the soccer ball 320d. The image processor 202 may be configured to determine a presence of at least one human body in the FOV 320 based on one or more human detection algorithms. The image processor 202 may determine that the FOV 320 includes three human bodies, such as the first player 320a, the second player 320b, and the third player 320c. The image processor 202 may be further configured to generate the first confidence map 322, based on one or more dynamic modeling algorithms and human detection algorithms, retrieved from the memory 206. Thus, in the first confidence map 322, only the first region 322a, the second region 322b, and the third region 322c (which correspond to human subjects), such as the first player 320a, the second player 320b, and the third player 320c, respectively, are included. Further, in the first confidence map 322, the first region 322a, the second region 322b, and the third region 322c may be represented with the same intensity values.

The image processor 202 may be further configured to generate the second confidence map 324 based on one or more dynamic modeling algorithms and motion detection algorithms. The first region 324a, the second region 324b, and the third region 324c corresponding to the motion values of the first player 320a, the second player 320b, and the third player 320c, respectively, are included in the second confidence map 324. The second confidence map 324 may further include the fourth region 324d that corresponds to motion values of the soccer ball 320d. For example, the motion values for the first player 320a, the second player 320b, and the third player 320c, and the soccer ball 320d may be determined as, "10 mph", "8 mph", "7 mph", and "1 mph" respectively. Thus, the first region 324a, the second region 324b, the third region 324c, and the fourth region 324d correspond to motion values "10 mph", "10 mph", "7 mph", and "1 mph", respectively, The first region 324a and the second region 324b may be represented with highest intensity value as compared with the intensity values of the third region 324c and the fourth region 324d due to an association with the highest motion value (i.e., "10 mph").

The image processor 202 may be configured to generate the third confidence map 326, based on one or more of dynamic modeling algorithms and depth detection algorithms. The first region 326a, the second region 326b, the third region 336c, and the fourth region 326d in the third confidence map 326 may correspond to the depth values of the first player 320a, the second player 320b, the third player 320c, and the soccer ball 320d, respectively. The depth values for the first player 320a, the second player 320b, the third player 320c, and the soccer ball 320d may be determined as, "$z_1$", "$z_2$", "$z_3$", and "$z_4$", respectively, with "$z_1$" assumed to be the smallest depth value among "$z_1$", "$z_2$", "$z_3$", and "$z_4$". Thus, the first region 326a in the third confidence map 326 may be represented with high intensity value as compared with the intensity values of the second region 326b, the third region 326c, and the fourth region 326d due to an association with the smallest depth value among "$z_1$".

The image processor 202 may be further configured to generate the fourth confidence map 328 based on an averaging of the first confidence map 322 and the second confidence map 324. The fourth confidence map 328 may include regions, such as the first region 328a, the second region 328b, and the third region 328c, corresponding human bodies, such as the first player 320a, the second player 320b, the third player 320c, in the FOV 320. Thus, the fourth confidence map 328 may not include any region corresponding to the soccer ball 320d. The image processor 202 may be further configured to determine whether the highest motion value among the motion values of the first region 328a, the second region 328b, and the third region 328c a pre-determined motion threshold value (such as "1 mph"). The image processor 202 may determine that the first region 328a and the second region 328b are associated with the highest motion value (i.e., "10 mph") which exceeds the pre-determined motion threshold value (such as "1 mph"). Thus, the image processor 202 may determine the first region 328a and the second region 328b to be candidate focus areas based on the determined high motion values represented by higher intensity values in comparison to the third region 328c in the fourth confidence map 328.

The image processor 202 may be further configured to generate the final confidence map 330 based on an averaging of the fourth confidence map 328 and the third confidence map 326. The image processor 202 may determine a region in the final confidence map that corresponds to a human body with smallest depth value and highest motion value based on a pre-determined rule in the set of pre-determined rules applied to the final confidence map 330. The image processor 202 may determine that the first region 330a in the final confidence map 330 corresponds to a human body that has the highest motion value (i.e., "10 mph") and the smallest depth value (i.e., "$z_1$"). Thus, the image processor 202 may determine the focus area 330d encompassing the first region 330a in the final confidence map 330. The focus area 330d may correspond to the first player 320a represented by a dotted line that has the smallest depth value and the highest motion value, as shown in FIG. 3B.

The image processor 202 may be configured to set the focus area 332a in the image 332. The focus area 332a in the image 332 may correspond to the focus area 330d, as shown in the final confidence map 330. The focus area 332a may correspond to the first player 320a with the smallest depth value and the highest motion value in the image 332. Thus, the image-capturing unit 204 may capture the image 332 with the focus area 332a that corresponds to the FOV 320.

Alternatively, in accordance with an embodiment, the depth values may not be used (or ignored) and the human detection and motion detection algorithms may be used. For instance, the image processor 202 may determine that the first region 324a, the second region 324b, the third region 324c, and the fourth region 324d correspond to motion values "10 mph", "8 mph", "7 mph", and "1 mph", respectively, in the second confidence map 324. In this scenario, the image processor 202 may determine that the first region 328a is associated with the highest motion value (i.e., "10 mph") which exceeds the pre-determined motion threshold value (such as "1 mph"). Thus, the image processor 202 may determine the first region 328a to be candidate focus areas based on the determined high motion value. In this, scenario, the image processor 202 may ignore the third confidence map 326 (i.e., the depth values) to determine the focus area. In such a case, the image processor 202 may set the focus area 332a in the image 332 simply based on the determined candidate focus area, such as first region 328a, in the fourth confidence map 328. The focus area 332a may correspond to the first player 320a who happens to be a human (as detected) with the highest motion value in the image 332. Thus, the image-capturing unit 204 may capture the image 332 with the focus area 332a that corresponds to the FOV 320.

Figure 3C:
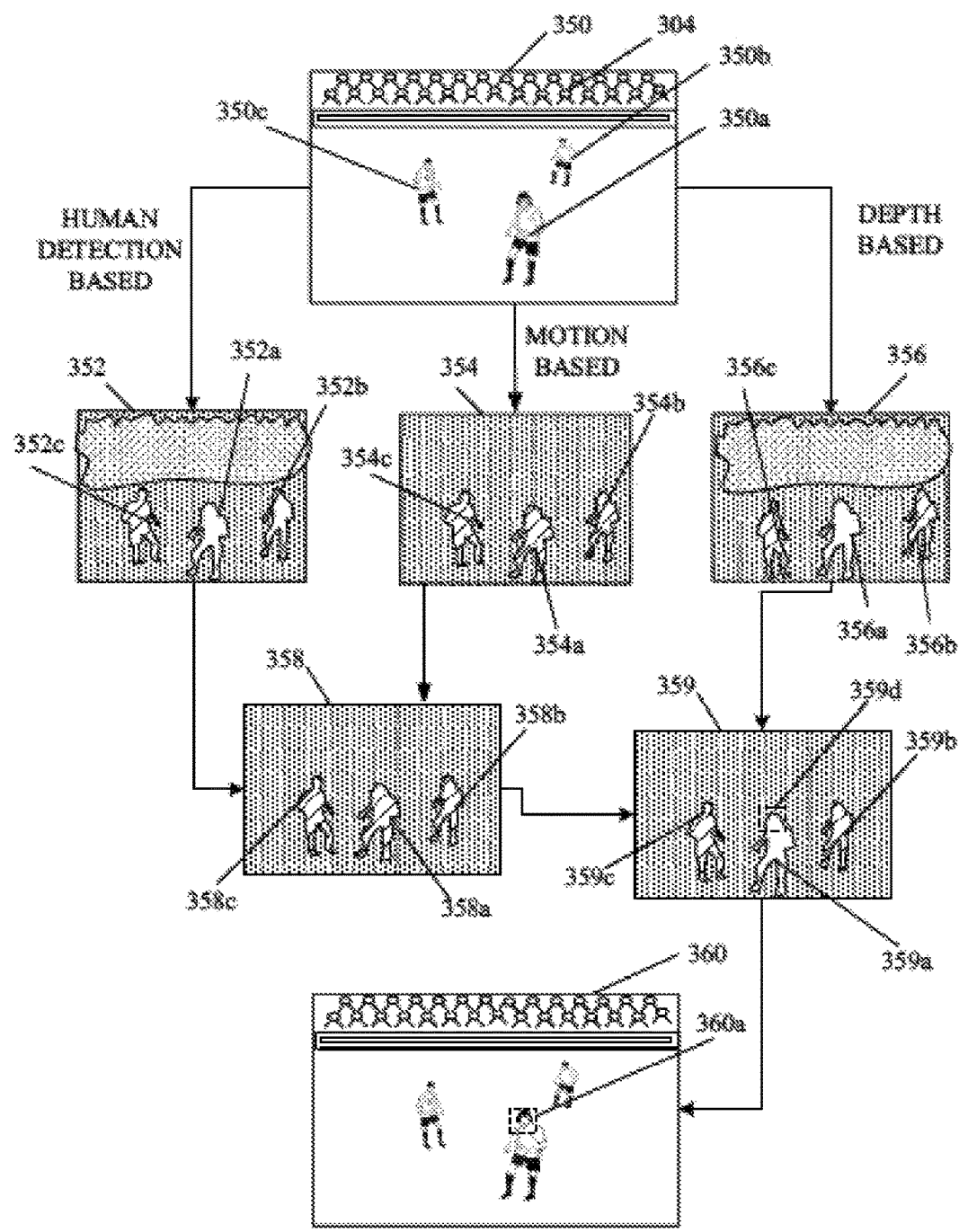

With reference to FIG. 3C, there is shown an FOV 350, a first confidence map 352, a second confidence map 354, a third confidence map 356, a fourth confidence map 358, a final confidence map 359, and an image 360. The first confidence map 352 may comprise a first region 352a, a second region 352b, and a third region 352c. The second confidence map 354 may comprise a first region 354a, a second region 354b, and a third region 354c. The third confidence map 356 may comprise a first region 356a, a second region 356b, and a third region 356c. The fourth confidence map 358 may comprise a first region 358a, a second region 358b, a third region 358c. The final confidence map 359 may comprise a first region 359a, a second region 359b, a third region 359c, and a focus area 359d. The image 360 may comprise a focus area 360a. FIG. 3C is explained in conjunction with elements from FIG. 1, FIG. 2 FIG. 3A, and FIG. 3B.

In accordance with a third exemplary scenario, as illustrated in FIG. 3C, the FOV 350 may comprise a plurality of objects, such as the audience 304, the first player 350a, the second player 350b, and the third player 350c. The image processor 202 may be configured to generate the first confidence map 352, based on one or more of dynamic modeling algorithms, human detection algorithms, and human face detection algorithms. The first region 352a, the second region 352b, and the third region 352c may correspond to the first player 350a, the second player 350b, and the third player 350c, respectively. As the soccer ball 320d is not present in the FOV 350, there may be no region that corresponds to the soccer ball 320d. The image processor 202 may detect the facial portions of the first player 350a and the second player 350b in the final confidence map 359. However, a facial portion of the third player 350c may not be detected. In certain scenarios, human face or the facial portions of the plurality of objects in the FOV, such as the FOV 350, cannot be determined. For example, a user may be wearing a helmet in a game or the user may turn around such that face portion is not visible for certain time duration. In such scenarios, when human face or the facial portions cannot be detected, a human body may still be detected based on features associated with complete human body instead of facial features and pre-defined rules. Thus, the first confidence map 352 may include the first region 352a and the second region 352b represented with higher intensity values as compared to the intensity value of third region 352c.

Further, the image processor 202 may be configured to generate the second confidence map 354, based on one or more of dynamic modeling algorithms and motion detection algorithms. The second confidence map 354 may comprise the first region 354a, the second region 354b, and the third region 354c. The first region 354a, the second region 354b, and the third region 354c may correspond to the motion values of the first player 350a, the second player 350b, and the third player 350c, respectively. The motion values of the first player 350a, the second player 350b, and the third player 350c may be determined as, "0.5 mph", "0.5 mph", and "0.5 mph", respectively (i.e. same motion values). The determined motion values of the first player 350a, the second player 350b, and the third player 350c may be less than the pre-determined motion threshold value, such as, "1 mph".

Further, the image processor 202 may be configured to generate the third confidence map 356, based on one or more of dynamic modeling algorithms and depth detection algorithms. The third confidence map 356 may comprise the first region 356a, the second region 356b, and the third region 356c. The first region 356a, the second region 356b, and the third region 356c may correspond to the depth values of the first player 350a, the second player 350b, and the third player 350c, respectively. The depth values of the first player 350a, the second player 350b, and the third player 350c may be determined as, "$z_1$", "$z_2$", and "$z_3$", respectively, such that "$z_1$" has the smallest depth value. Thus, in the third confidence map 356, the first region 356a may be represented with highest intensity value, as compared with the intensity values of the second region 356b, and the third region 356c.

The image processor 202 may be further configured to generate the fourth confidence map 358 based on an averaging of the first confidence map 352 and the second confidence map 354. The fourth confidence map 358 may include regions, such as the first region 358a, the second region 358b, and the third region 358c, corresponding to human bodies, such as the first player 350a, the second player 350b, the third player 350c, in the FOV 350. The image processor 202 may be further configured to determine that the motion values of the first player 350a, the second player 350b, and the third player 350c may be same. Further, the determined motion values of the first player 350a, the second player 350b, and the third player 350c may be less than the pre-determined motion threshold value, such as, "1 mph". Thus, the first region 358a, the second region 358b, and the third region 358c may be represented by same intensity values in the fourth confidence map 358.

The image processor 202 may be further configured to generate the final confidence map 359 based on an averaging of the fourth confidence map 358 and the third confidence map 356. The image processor 202 may be configured to further apply facial recognition algorithms on the final confidence map 359. The image processor 202 may detect the facial portions of the first player 350a and the second player 350b in the final confidence map 359. However, a facial portion of the third player 350c may not be detected. The image processor 202 may be further configured to determine a focus area that corresponds to a detected facial portion having the smallest depth value based on a pre-determined rule in the set of pre-determined rules. The image processor 202 may apply the pre-determined rule to determine that the first region 359a in the final confidence map 359 is associated with a detected facial portion and further the depth value (i.e., "$z_1$") of the first region 359a is smallest among all the detected facial portions, such as the facial portion of the first player 350a and the second player 350b in the final confidence map 359. Thus, the image processor 202 may determine the focus area 359d encompassing the first region 359a in the final confidence map 359. The focus area 359d (represented by a dotted line, as shown in FIG. 3C) may correspond to the front view of the facial portion of the first player 350a. The image processor 202 may be configured to set the focus area 360a in the image 360. The focus area 360a in the image 360 may correspond to the focus area 359d (as shown in the final confidence map 359). The focus area 360a may correspond to the front view of the facial portion of the first player 350a in the image 360. Thus, the image-capturing unit 204 may capture the image 360 with the focus area 360a that corresponds to the FOV 350.

Alternatively, in accordance with an embodiment, the depth values may not be used (or ignored) and the human detection and motion detection algorithms may be used. For instance, the image processor 202 may detect exclusively the facial portion of the first player 350a in the final confidence map 359. However, facial portions of the second player 350b and the third player 350c may not be detected. In this scenario, the image processor 202 may ignore the third confidence map 356 (i.e., the depth values) to determine the focus area. The image processor 202 may set the focus area 360a in the image 360 simply based on the detected facial portion, such as the facial portion of the first player 350a in the first region 358a, in the final confidence map 359. The focus area 360a may correspond to the first player 320a whose facial portion happens to be detected in the image 360.

Figure 3D:
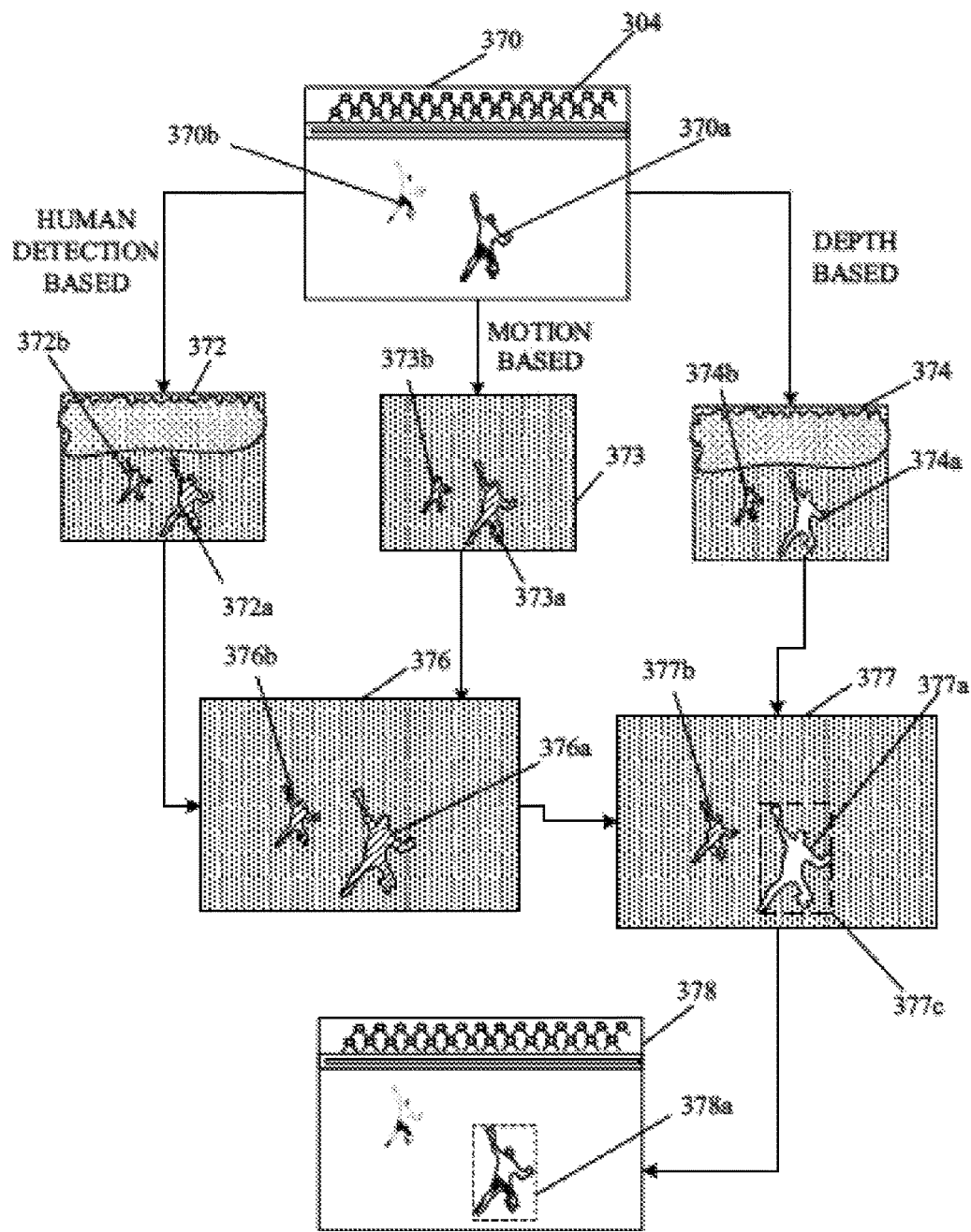
Figure 3B:
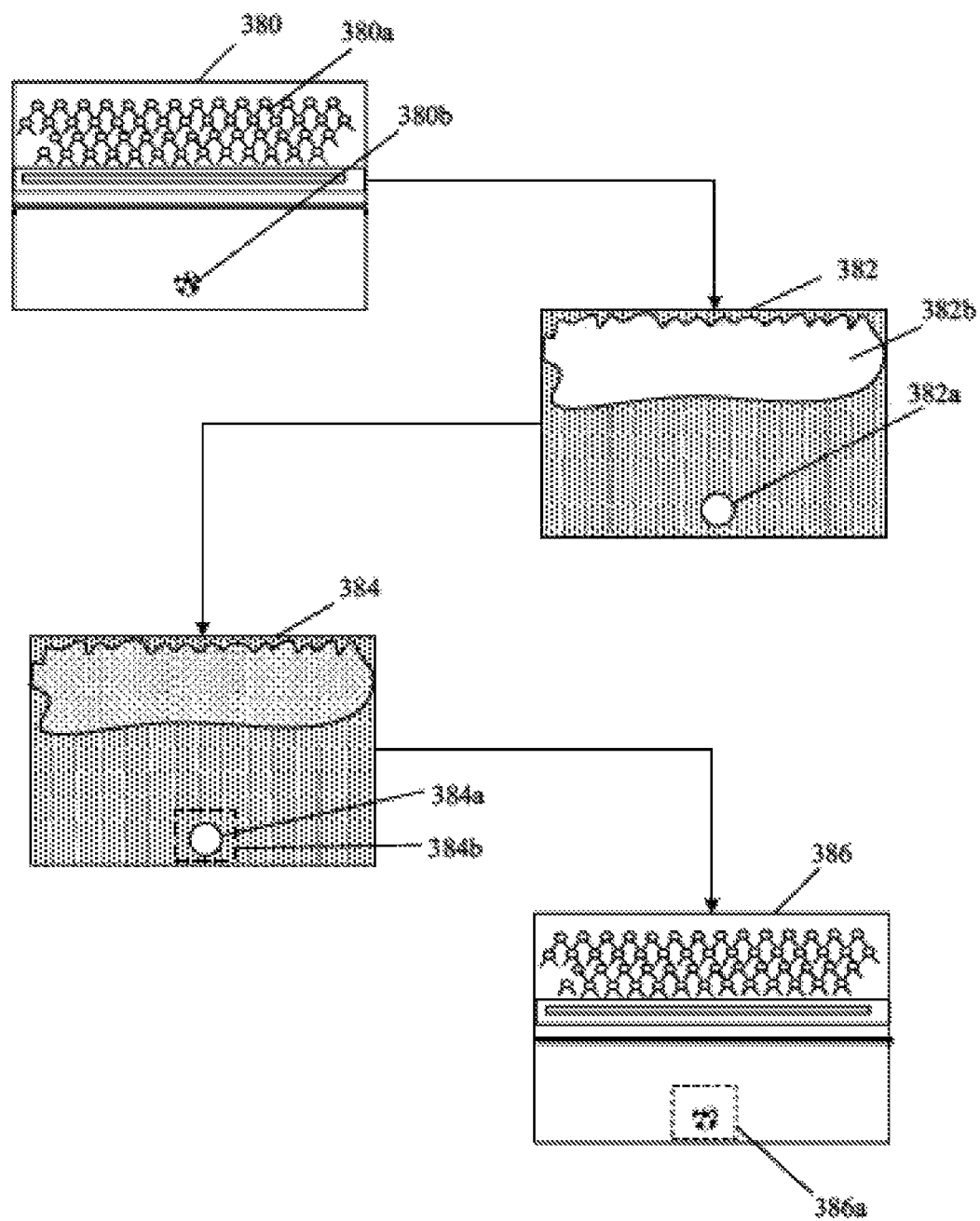

With reference to FIG. 3D, there is shown an FOV 370, a first confidence map 372, a second confidence map 373, a third confidence map 374, a fourth confidence map 376, a final confidence map 377, and an image 378. The first confidence map 372 may comprise a first region 372a and a second region 372b. The second confidence map 373 may comprise a first region 373a and a second region 373b. The third confidence map 374 may comprise a first region 374a and a second region 374b. The fourth confidence map 376 may comprise a first region 376a and a second region 376b. The final confidence map 377 may comprise a first region 377a, a second region 377b, and a focus area 377c. The image 378 may comprise a focus area 378a. FIG. 3D is explained in conjunction with elements from FIG. 1, FIG. 2, FIG. 3A to FIG. 3C.

In accordance with a fifth exemplary scenario, as illustrated in FIG. 3D, the FOV 370 may comprise plurality of objects, such as the audience 304, a first player 370a and a second player 370b. The image processor 202 may be configured to generate the first confidence map 372, based on one or more of dynamic modeling algorithms and human detection algorithms. The first region 372a and the second region 372b may correspond to the back portion of first player 370a and the second player 370b, respectively. Thus, in the first confidence map 372, the first region 372a and the second region 372b may be represented with the same intensity values as the facial portions of the first player 370a and the second player 370b may not be detected. In certain scenarios, human face or the facial portions of the plurality of objects in the FOV, such as the FOV 370, cannot be determined. For example, a user may be wearing a helmet in a game or the user may turn around such that face portion is not visible for certain time duration. In such scenarios, when human face or the facial portions cannot be detected, a human body may still be detected based on features associated with complete human body instead of facial features and pre-defined rules.

Further, the image processor 202 may be configured to generate the second confidence map 373, based on one or more of dynamic modeling algorithms and motion detection algorithms. The second confidence map 373 may comprise the first region 373a and the second region 373b. The first region 373a and the second region 373b may correspond to the motion values of the first player 370a and the second player 370b, respectively. The motion values of the first player 370a and the second player 370b may be determined as, "0.5 mph" and "0.5 mph", respectively. The determined motion values of the first player 370a and the second player 370b may be less than the pre-determined motion threshold value, such as, "1 mph". Thus, in the second confidence map 373, the first region 373a and the second region 373b may be represented with same intensity.

The image processor 202 may be further configured to generate the third confidence map 374, based on one or more of dynamic modeling algorithms and depth detection algorithms. The third confidence map 374 may comprise the first region 374a and the second region 374b. The first region 374a and the second region 374b may correspond to the depth values of the first player 370a and the second player 370b, respectively. The depth values of the first player 370a and the second player 370b may be determined as, "$z_1$" and "$z_2$", respectively, such that "$z_1$" is smaller than "$z_2$". Thus, in the third confidence map 374, the first region 374a may be represented with a higher intensity value, as compared with the intensity value of the second region 374b.

The image processor 202 may be further configured to generate the fourth confidence map 376 based on an averaging of the first confidence map 372 and the second confidence map 373. The fourth confidence map 376 may include regions, such as the first region 376a and the second region 376b, corresponding to human bodies, such as the first player 370a and the second player 370b, in the FOV 370. The image processor 202 may be further configured to determine that the motion values of the first player 370a and the second player 370b may be same. Further, the determined motion values of the first player 370a and the second player 370b, may be less than the pre-determined motion threshold value, such as, "1 mph". Thus, the first region 376a and the second region 376b may be represented by same intensity values in the fourth confidence map 376.

The image processor 202 may be further configured to generate the final confidence map 377 may be generated based on an averaging of the fourth confidence map 376 and the third confidence map 374. The image processor 202 may be configured to apply a pre-determined rule in the set of pre-determined rules to the final confidence map 377 to determine the focus area 377c. Based on the pre-determined rule, when the determined motion values of human bodies in a FOV are less than the pre-determined motion threshold value and facial portions of the human bodies are not detected, a human body having the smallest depth value in the FOV may be determined to be a focus area. Thus, based on the pre-determined rule, the image processor 202 may determine the focus area 377c encompassing the first region 376a in the final confidence map 377. The focus area 377c (represented by a dotted line, as shown in FIG. 3D) may correspond to the first player 370a with the smaller depth value. Thus, the first player 370a detected in the FOV 370 may be determined as closest human body within the FOV 370. The image processor 202 may be configured to set the focus area 378a in the image 378. The focus area 378a in the image 378 may correspond to the focus area 376c (as shown in the final confidence map 377). The focus area 378a may correspond to the first player 370a with the smallest depth value in the image 378. Thus, the image-capturing unit 204 may capture the image 378 with the focus area 378a that corresponds to the FOV 370. Thus, the focus area may be dynamically set as per the pre-defined rules associated with a type of object (such as human, or non-human), an orientation of object, and positions of object, motion state of the object, and/or a size of the object with a current FOV, and for different FOVs.

With reference to FIG. 3E, there is shown an FOV 380, a first confidence map 382, a final confidence map 384, and an image 386. The first confidence map 382 may comprise a first region 382a and a second region 382b. The final confidence map 384 may comprise a first region 384a and a focus area 384b. The image 386 may comprise a focus area 386a. FIG. 3E is explained in conjunction with elements from FIG. 1, FIG. 2, FIG. 3A to FIG. 3D.

In accordance with a sixth exemplary scenario, as illustrated in FIG. 3E, the FOV 380 may comprise plurality of objects, such as an audience 380a and soccer ball 380b. The image processor 202 may be configured to generate the first confidence map 382, based on one or more of dynamic modeling algorithms and depth detection algorithms. The first region 382a may correspond to the audience 380a and the second region 382b may correspond to the soccer ball 380b. The depth values of the first region 382a and the second region 382b may be determined as, "$z_1$" and "$z_2$", respectively, such that "$z_1$" is smaller than "$z_2$". Thus, the first region 382a may be represented with a higher intensity value, as compared to the intensity value of the second region 382b in the first confidence map 382.

Further, the final confidence map 384 may be generated based on normalization of the first confidence map 382. The image processor 202 may be configured to apply a pre-determined rule in the set of pre-determined rules to the final confidence map 384 to determine the focus area 384b. Based on the pre-determined rule, when a FOV does not include any human body, an object with smallest depth value in the FOV may be determined to be a focus area. Thus, the image processor 202 may determine the focus area 384b encompassing the first region 384a in the final confidence map 384, based on the pre-determined rule. The focus area 384b (represented by a dotted line, as shown in FIG. 3E) may correspond to a region with smallest depth value in the final confidence map 384. The image processor 202 may be configured to set the focus area 386a in the image 386. The focus area 386a in the image 386 may correspond to the first region 384a (in the final confidence map 384). The focus area 386a may correspond to a region with smallest depth value in the image 386. Thus, the image-capturing unit 204 may capture the image 386 with the focus area 386a that corresponds to the FOV 380.

Figure 4A:
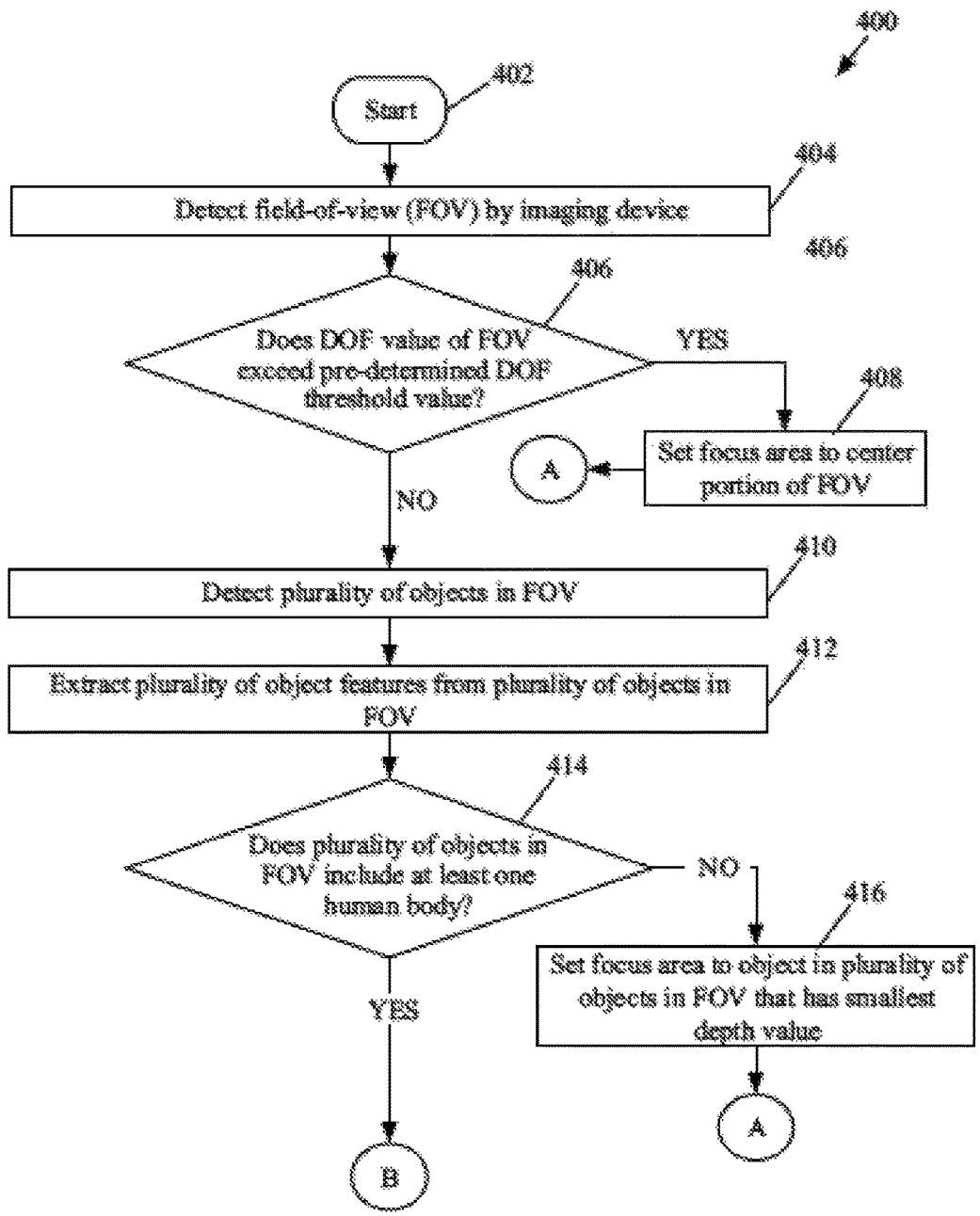
FIGS. 4A, 4B, and 4C, collectively, depict a flowchart that illustrates a method for image processing, in accordance with an embodiment of the disclosure.
Figure 4B:
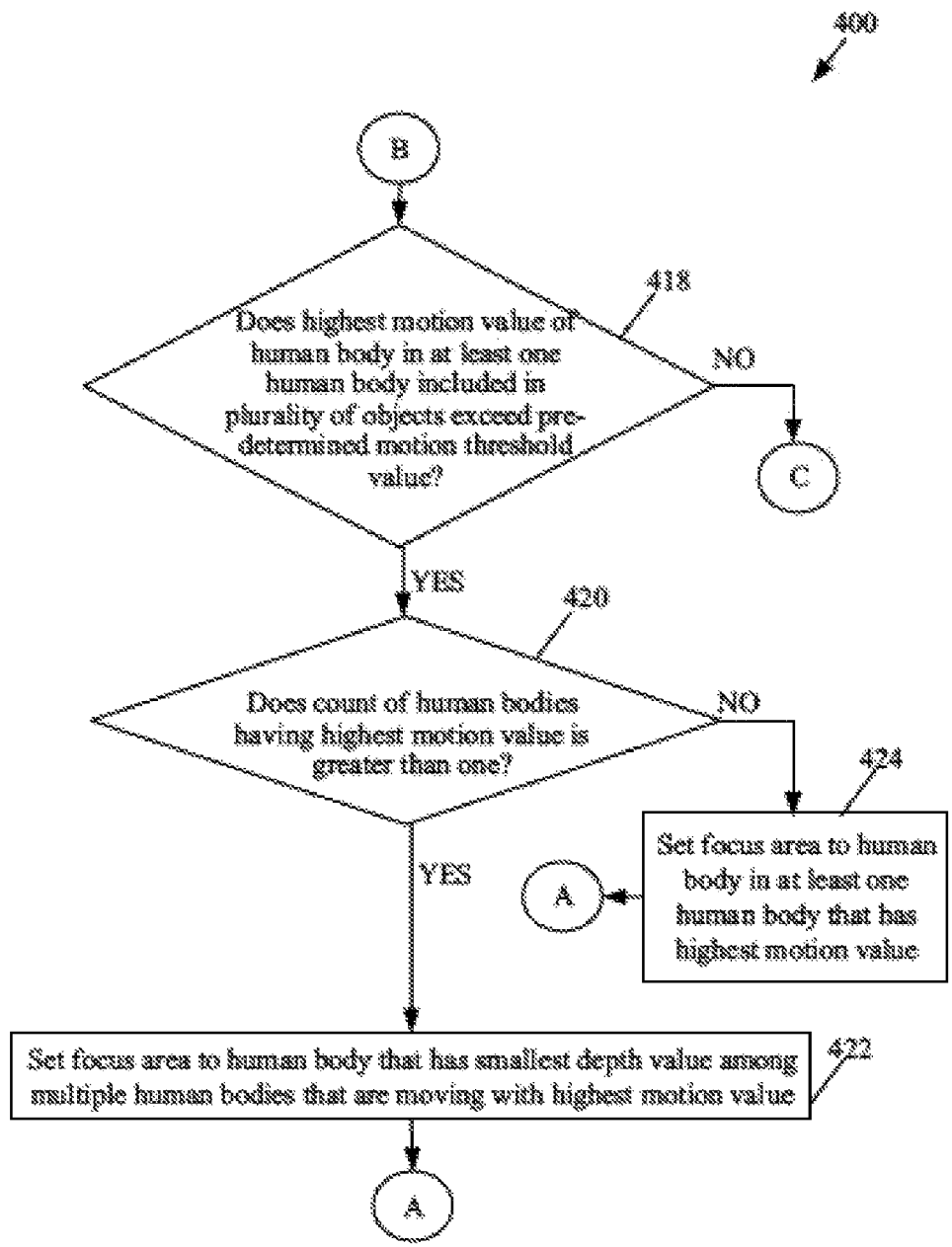
Figure 4C:
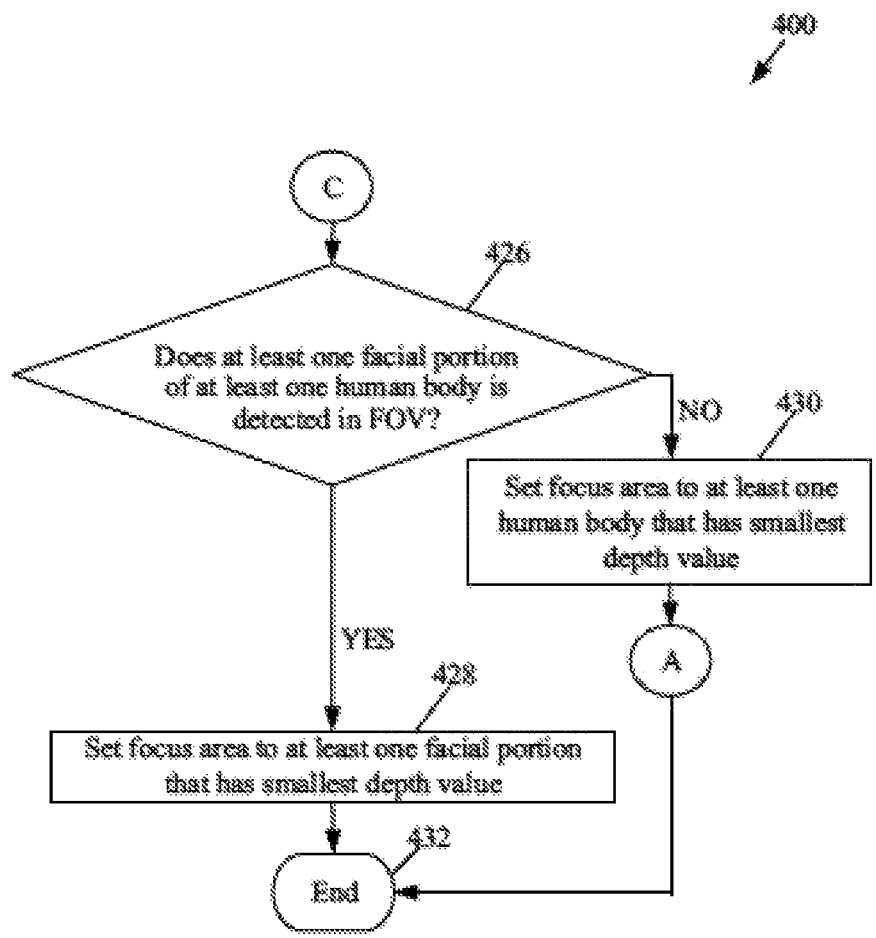

FIGS. 4A, 4B, and 4C, collectively, depict a flowchart that illustrates a method for image processing, in accordance with an embodiment of the disclosure. With reference to FIGS. 4A, 4B, and 4C, there is shown a flow chart 400. The flow chart 400 is described in conjunction with FIGS. 1, 2, and 3A to 3E. The method starts at 402 and proceeds to 404.

At 404, the FOV may be detected by the image-capturing unit 204 of the imaging device 102. An example is shown and described in FIGS. 3A to 3E, where the imaging device 102 detects the FOV 302, FOV 320, 350, 370, or 380. At 406, it may be determined whether the DOF value of the FOV exceeds a pre-determined DOF threshold value. For instance, the determination of a focus area corresponding to the FOV based on the DOF value of the FOV exceeding the pre-determined DOF threshold may correspond to a first pre-determined rule. The control may pass to 408, if the imaging device 102 determines that the DOF value of the FOV exceeds the pre-determined DOF threshold value. Else, the control may pass to 410.

At 408, the focus area may be set to the center portion of the FOV. An example is shown and described in FIG. 3A, where the focus area 312a is set to the center portion of the FOV 302 of the image 312. The Control may pass to the end 432.

At 410, the plurality of objects in the FOV may be detected. Examples are shown and described in FIGS. 3A to 3E, where the plurality of objects, such as the audience 304 and the soccer ball 306, is detected in the FOV 302. The plurality of objects, such as the audience 304, the first player 320a, the second player 320b, the third player 320c, and the soccer ball 320d, is detected in the FOV 320. The plurality of objects, such as the audience 304, the first player 350a, the second player 350b, and the third player 350c, is detected in the FOV 350. The plurality of objects, such as the audience 304, the first player 370a and the second player 370b, is detected in the FOV 370. The plurality of objects, such as the audience 380a and the soccer ball 380b, is further detected in the FOV 380.

At 412, the plurality of object features may be extracted from the plurality of objects in the FOV. The image processor 202 may be configured to generate a plurality of confidence maps based on the extracted plurality of object features. The image processor 202 may further utilize the generated confidence maps to determine the focus area corresponding to the FOV by use of a pre-determined rule in the set of pre-determined rules. The pre-determined rule may be extracted by the image processor 202 from the memory 206 based on a probability of usage of each of the set of pre-determined rules for an event. The probability of usage of each of the set of pre-determined rules for various events may be stored in the statistical model. The set of pre-determined rules may comprise the first pre-determined rule, a second pre-determined rule, a third pre-determined rule, a fourth pre-determined rule, a fifth pre-determined rule, or a sixth pre-determined rule. Examples are shown and described in FIGS. 3A to 3E, where confidence maps, such as the initial confidence map 308, are generated based on the extracted plurality of object features from the plurality of objects in the FOV 302. Other examples of the generated confidence maps include the first confidence map 322, the second confidence map 324, the third confidence map 326, the fourth confidence map 328, the first confidence map 352, the second confidence map 354, the third confidence map 356, the first confidence map 372, the third confidence map 374, and the first confidence map 382. The further determination of the focus area based on the set of pre-determined rules is described in operations 414 to 432.

At 414, it may be determined whether the plurality of objects in the FOV includes at least one human body. The control may pass to 416 if the plurality of objects in the FOV does not include the at least one human body. Else, the control may pass to 418. At 416, the focus area may be set to an object in the plurality of objects in the FOV that has smallest depth value. Alternatively stated, the focus area may be set to a closest object in the plurality of objects, based on the absence of the at least one human body in the plurality of objects. The setting of the focus area to the object with the smallest depth value may correspond to the second pre-determined rule in the set of pre-determined rules. An example is shown and described in FIG. 3E, where the focus area 386a correspond to a region with smallest depth value in the image 386. The control may pass to the end 432.

At 418, it may be determined whether the highest motion value of a human body in the at least one human body included in the plurality of objects exceeds a pre-determined motion threshold value. The control may pass to 420, if the highest motion value of the human body in the at least one human body exceeds the second pre-determined threshold. Else, the control may pass to 426.

At 420, it may be determined whether a count of human bodies having the highest motion value is greater than one. Alternatively stated, it may be determined whether multiple human bodies in the at least one human body are moving with the highest motion value. The control may pass to 422, if it is determined that the count of human bodies having the highest motion value is greater than one. Else, the control may pass to 424.

At 422, the focus area may be set to a human body that has smallest depth value among the multiple human bodies that are moving with the highest motion value. The setting of the focus area to the human body that has smallest depth value among the multiple human bodies that are moving with the highest motion value may correspond to a third pre-determined rule in the set of pre-determined rules. An example is shown and described in FIG. 3B, where, the focus area 332a in the image 332 corresponds to the first player 320a with the smallest depth value and the highest motion value in the image 332 among the multiple human bodies (such as the first player 320a and the second player 320b) that are moving with the highest motion value. The control may pass to the end 432.

At 424, the focus area may be set to the human body in the at least one human body that has the highest motion value. In other words, when it is determined that the count of human bodies having the highest motion value is one, the focus area may be set to the human body that has the highest motion value. The setting of the focus area to the human body with in the at least one human body that has the highest motion value may correspond to the fourth pre-determined rule in the set of pre-determined rules. The control may pass to the end 432.

At 426, it may be determined whether at least one facial portion of the at least one human body is detected in the FOV. The control may pass to 428, if it is determined that the at least one facial portion of the at least one human body is detected. Else, the control may pass to 430.

At 428, the focus area may be set to the at least one facial portion that has the smallest depth value. Alternatively stated, if multiple facial portions of the multiple human bodies are detected in the FOV, the focus area may be set to a facial portion that has the smallest depth value among the multiple facial portions. The setting of the focus area to the facial portion that has the smallest depth value among the multiple facial portions may correspond to the fifth pre-determined rule in the set of pre-determined rules. An example is shown and described in FIG. 3C, where the focus area 360a corresponds to the front view of the facial portion of the first player 350a in the image 360 that has the smallest depth value. The control may pass to the end 432.

At 430, the focus area may be set to the at least one human body that has the smallest depth value. In other words, when human face or the facial portions cannot be detected, a human body may still be detected using pre-defined rules. Further, if multiple human bodies are detected, then depth values obtained for different human bodies may be used to ascertain the closest human body detected within the FOV. The focus area may then be set to the detected closest human body. The setting of the focus area to the at least one human body that has the smallest depth value may correspond to the sixth pre-determined rule in the set of pre-determined rules. An example is shown and described in FIG. 3D, where the focus area 378a in the image 378 corresponds to the first player 370a with the smallest depth value in the image 378. The control may pass to the end 432.

In accordance with an embodiment of the disclosure, an imaging device 102 to process an image is disclosed. The imaging device 102 may comprise one or more circuits of the imaging device 102 that may be configured to process an FOV of the image-capturing unit 204. The FOV may comprise a plurality of objects. The imaging device 102 may be configured to extract a plurality of object features of the plurality of objects in the FOV. Based on the extracted plurality of the object features, a plurality of confidence maps may be generated. The one or more circuits of the imaging device 102 may be configured to perform averaging on the plurality of confidence maps to generate a final confidence map. Based on the generated final confidence map, a focus area within the FOV of the generated final confidence map may be determined.

Various embodiments of the disclosure may provide a non-transitory computer readable medium and/or storage medium, wherein there is stored thereon, a machine code and/or a computer program with at least one code section executable by a machine and/or a computer to process an image. The at least one code section in the imaging device 102 may cause the machine and/or computer to perform the steps that comprise the detection of an FOV comprises a plurality of objects. A plurality of object features of the plurality of objects may be extracted. A plurality of confidence maps may be generated, based on the extracted plurality of object features. A focus area that corresponds to the FOV may be determined, based on the generated plurality of confidence maps by use of a pre-determined rule.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for image processing, said method comprising:
    extracting, by an imaging device, a plurality of object features of a plurality of objects,
        wherein the plurality of objects are in a field-of-view (FOV) of said imaging device;
    generating, by said imaging device, a plurality of confidence maps based on said extracted plurality of object features;
    determining, by said imaging device, a focus area corresponding to said FOV based on said generated plurality of confidence maps and a specific rule.

2. The method according to claim 1, further comprising capturing, by said imaging device, an image of said FOV, based on said determined focus area.

3. The method according to claim 1, further comprising setting, by said imaging device, said determined focus area to a center portion of said FOV when said specific rule specifies that a depth-of-field (DOF) value of said FOV exceeds a DOF threshold value.

4. The method according to claim 3, wherein said DOF value is determined based on setting parameters of said imaging device and depth information of said FOV.

5. The method according to claim 1, further comprising detecting, by said imaging device, said plurality of objects in said FOV, wherein said plurality of objects corresponds to at least one human being.

6. The method according to claim 5, further comprising setting, by said imaging device, said determined focus area to a first object of said plurality of objects when said specific rule specifies that a motion value of said first object is greater than a motion value of each of remaining objects in said plurality of objects.

7. The method according to claim 5, further comprising setting, by said imaging device, said determined focus area to a first object of said plurality of objects when said specific rule specifies that motion values of said plurality of objects are equal and a depth value of said first object is smaller than a depth value of each of remaining objects in said plurality of objects.

8. The method according to claim 5, further comprising setting, by said imaging device, said determined focus area to a front view of a facial portion of a first object among said plurality of objects when said specific rule specifies that motion values of said plurality of objects are less than a threshold value and a depth value of said first object is smaller than a depth value of a facial portion portions of each of remaining objects in said plurality of objects.

9. The method according to claim 5, further comprising setting, by said imaging device, said determined focus area to a first object among said plurality of objects when said specific rule specifies that facial portions of said plurality of objects are undetected,
    wherein said first object is a human being, of said at least one human being, with a smallest depth value when a presence of said at least one human being is detected independent of facial detection of said at least one human being, and
    wherein said first object is a non-human object with a smallest depth value when said at least one human being is absent in said FOV.

10. The method according to claim 1, further comprising setting, by said imaging device, said determined focus area to a first object among said plurality of objects when said specific rule specifies that a depth value of said first object is smaller than a depth value of each of remaining objects in said plurality of objects.

11. The method according to claim 1, wherein said specific rule is based on at least one of a lens setting, depth information, or motion information of said plurality of objects in said FOV of said imaging device.

12. The method according to claim 1, further comprising generating, by said imaging device, a final confidence map.

13. The method according to claim 12, wherein said determination of said focus area is within said final confidence map of said FOV.

14. An imaging device, comprising:
    circuitry configured to:
        extract a plurality of object features of a plurality of objects,
            wherein the plurality of objects are in a field-of-view (FOV) of said imaging device;
        generate a plurality of confidence maps based on said extracted plurality of object features; and
        determine a focus area corresponding to said FOV based on said generated plurality of confidence maps and a specific rule.

15. The imaging device according to claim 14, wherein said circuitry is further configured to capture an image of said FOV, based on said determined focus area.

16. The imaging device according to claim 15, wherein said circuitry is further configured to set said determined focus area to a center portion of said FOV when said specific rule specifies that a depth-of-field (DOF) value of said FOV exceeds a DOF threshold value.

17. The imaging device according to claim 16, wherein said DOF value is determined based on setting parameters of said imaging device and depth information of said FOV.

18. The imaging device according to claim 14, wherein said FOV comprises said plurality of objects, and
said plurality of objects correspond to at least one human being.

19. The imaging device according to claim 18, wherein said circuitry is further configured to set said determined focus area to a first object of said plurality of objects when said specific rule specifies that a motion value of said first object is greater than a motion value of each of remaining objects in said plurality of objects.

20. The imaging device according to claim 18, wherein said circuitry is further configured to set said determined focus area to a first object of said plurality of objects when said specific rule specifies that motion values of said plurality of objects are equal and a depth value of said first object is smaller than a depth value of each of remaining objects in said plurality of objects.

21. The imaging device according to claim 18, wherein said circuitry is further configured to set said determined focus area to a front view of a facial portion of a first object among said plurality of objects when said specific rule specifies that motion values of said plurality of objects are less than a threshold value and a depth value of said first object is smaller than a depth value of facial portion of each of remaining objects in said plurality of objects.

22. The imaging device according to claim 18, wherein said circuitry is further configured to set said determined focus area to a first object among said plurality of objects when said specific rule specifies that facial portions of said plurality of objects are undetected,
wherein said first object is a human being, of said at least one human being, with a smallest depth value when a presence of said at least one human being is detected independent of facial detection of said at least one human being, and
wherein said first object is a non-human object with a smallest depth value when said at least one human being is absent in said FOV.

23. The imaging device according to claim 14, wherein said circuitry is further configured to set said determined focus area to a first object among said plurality of objects when said specific rule specifies that a depth value of said first object is smaller than a depth value of each of remaining objects in said plurality of objects.

24. The imaging device according to claim 14, wherein said specific rule is based on at least one of a lens setting, depth information, or motion information of said plurality of objects in said FOV of said imaging device.

25. The imaging device according to claim 14, wherein said circuitry is further configured to generate a final confidence map based on said plurality of confidence maps.

26. The imaging device according to claim 25, wherein said determination of said focus area is within said FOV of said final confidence map.

27. A non-transitory computer-readable medium having stored thereon, computer-executable instructions that, when executed by a processor, cause the processor to execute operations, the operations comprising:
    extracting a plurality of object features of a plurality of objects,
        wherein the plurality of objects are in a field-of-view (FOV) of an imaging device;
    generating a plurality of confidence maps based on said extracted plurality of object features; and
    determining a focus area corresponding to said FOV based on said generated plurality of confidence maps and a specific rule.

28. A method for image processing, said method comprising:
    extracting, by an imaging device, a plurality of object features of a plurality of objects,
        wherein the plurality of objects are in a field-of-view (FOV) of said imaging device;
    generating, by said imaging device, a plurality of confidence maps based on said extracted plurality of object features;
    generating, by said imaging device, a final confidence map based on said plurality of confidence maps; and
    determining, by said imaging device, a focus area corresponding to said FOV based on said generated final confidence map and a specific rule,
        wherein said determination of said focus area is within said final confidence map of said FOV.

* * * * *